(12) United States Patent
Machida

(10) Patent No.: US 7,843,655 B2
(45) Date of Patent: Nov. 30, 2010

(54) OBJECTIVE OPTICAL SYSTEM AND ENDOSCOPE

(75) Inventor: Ryo Machida, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 45 days.

(21) Appl. No.: 12/476,544

(22) Filed: Jun. 2, 2009

(65) Prior Publication Data

US 2009/0303618 A1 Dec. 10, 2009

(30) Foreign Application Priority Data

Jun. 6, 2008 (JP) ............................. 2008-148910

(51) Int. Cl.
*G02B 9/06* (2006.01)
*A61B 1/04* (2006.01)

(52) U.S. Cl. ...................................... 359/794; 600/108

(58) Field of Classification Search ................ 359/661, 359/793, 794; 600/108

See application file for complete search history.

(56) References Cited

U.S. PATENT DOCUMENTS

| 6,118,590 A * | 9/2000 | Chiba | 359/642 |
| 6,134,056 A | 10/2000 | Nakamuka | |
| 7,738,180 B2 * | 6/2010 | Igarashi | 359/656 |

FOREIGN PATENT DOCUMENTS

WO WO99/06866 2/1999

* cited by examiner

*Primary Examiner*—David N Spector
(74) *Attorney, Agent, or Firm*—Arnold International; Bruce Y. Arnold

(57) ABSTRACT

An objective optical system includes, a first group having positive refractive power, a second group having positive refractive power, the first group having a first parallel flat plate, a diaphragm, a second parallel flat plate and a first plano-convex lens with its convex surface facing the image side in the above mentioned order as viewed from the object side, the first parallel flat plate, the second flat parallel plate and the first plano-convex lens forming a cemented lens, the second parallel flat plate being formed by an infrared absorption filter, the second group having a second plano-convex lens with its convex surface facing the object side.

5 Claims, 8 Drawing Sheets

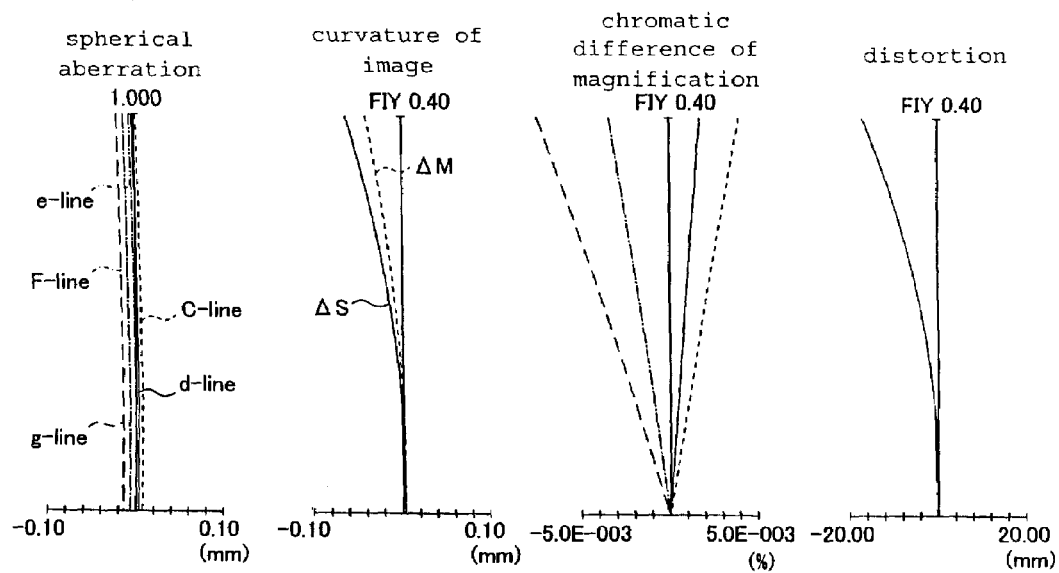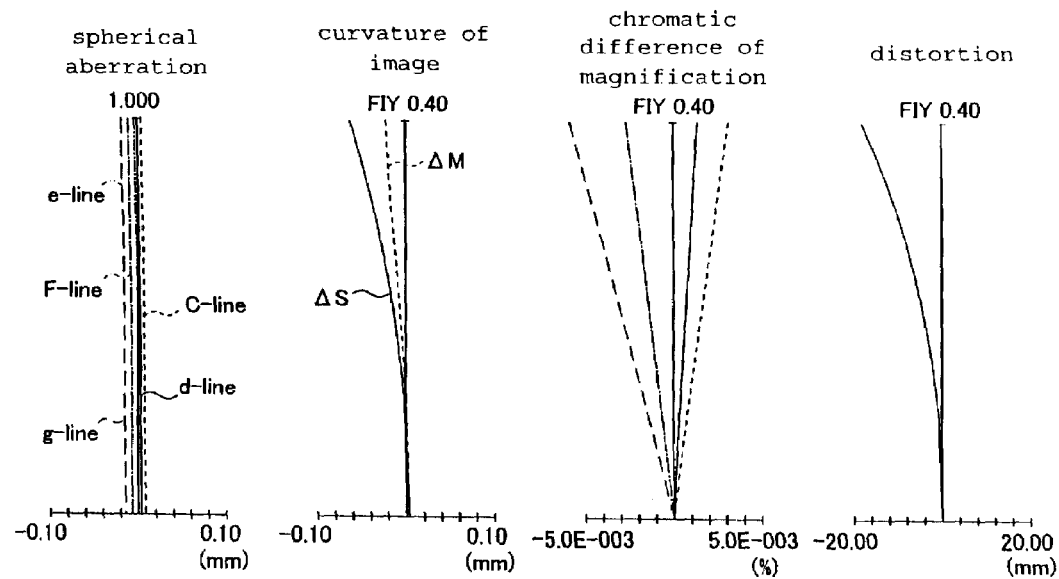

OBJECTIVE OPTICAL SYSTEM AND ENDOSCOPE

CROSS REFERENCE TO RELATED APPLICATIONS

This application claims benefit of Japanese Patent Application No. 2008-148910 filed in Japan on Jun. 6, 2008, the entire contents of which are incorporated herein by this reference.

BACKGROUND OF THE INVENTION

The present invention relates to an objective optical system and an endoscope. More particularly, the present invention relates to an endoscope to be combined with a laser probe for use.

In endoscope systems, an endoscope such as a ureteroscope is combined with a laser probe for use. A ureteroscope is employed to crush a renal pelvic calculus by lithotripsy from the ureter. A laser probe is driven from the treatment device insertion hole of an endoscope and a laser beam is irradiated to lithotripsy. The position of the front end of the probe is indicated by red guiding light but the halation produced by such guiding light gives rise to a problem to be solved. Additionally, the objective optical system needs to be downsized as much as possible in order to require the fine outer diameter of about ø3 mm. Furthermore, all the components including the CCD unit need to be downsized from the viewpoint of video-recording.

Small objective optical systems formed by using two positive lenses are known. On the other hand, an infrared cutoff filter has to be used to reduce the halation produced by guiding light. Thus, the lens itself is formed by an absorption type infrared cutoff filter in order to maintain the small size in some of such small objective optical systems.

However, when the lens itself is formed by an absorption type infrared cutoff filter, such a filter is not suited for mass production because the processability of the filter is poor from the viewpoint of hardness and easy abrasion. Additionally, when a lens formed by using an absorption type infrared cutoff filter is employed as first lens, it gives rise to problems in terms of durability and adaptability to living bodies. On the other hand, when a lens formed by using an interference type infrared cutoff filter is employed, its characteristics change as a function of oblique incidence so that a space needs to be provided in order to make parallel light enter the filter. Then, such a space by turn baffles the efforts for downsizing the objective optical system.

An optical system formed by arranging a positive first group and a positive second group sequentially from the side of the object, of which the first group is formed by bonding three components including a parallel flat plate, an infrared absorption filter and a plano-convex lens that are arranged in the above mentioned order from the side of the object, an aperture diaphragm being arranged between the infrared absorption filter and the plano-convex lens, has been disclosed (Patent Document 1).

Patent Document 1: International Patent Publication No. WO99/06866

However, in the optical system disclosed in the Patent Document 1, the diaphragm needs to be arranged at the image side of the infrared absorption filter or on the flat surface of the plano-convex lens by vapor deposition, which is a poor processability operation, and is not suited for mass production. Additionally, the Patent Document 1 does not describe anything about conditions for obtaining a good image quality.

In view of the above-identified problems, it is therefore the object of the present invention to provide a small objective optical system showing good color reproducibility and a reduced level of the halation due to guiding light of a laser probe.

SUMMARY OF THE INVENTION

In an aspect of the present invention, the above object of the invention is achieved by providing an objective optical system including: a first group having positive refractive power; and a second group having positive refractive power; the first group having: a first parallel flat plate; a diaphragm; a second parallel flat plate; and a first plano-convex lens with its convex surface facing the image side; in the above mentioned order as viewed from the object side; the first parallel flat plate, the second flat parallel plate and the first plano-convex lens forming a cemented lens; the second parallel flat plate being formed by an infrared absorption filter; the second group having: a second plano-convex lens with its convex surface facing the object side.

Thus, as the diaphragm is arranged between the first parallel flat plate and the infrared absorption filter, it can be arranged at the image side of the parallel flat plate by vapor deposition to dissolve the above-described processability problem.

Preferably, an objective optical system according to the present invention satisfies the requirement of condition formula (1) shown below:

$$0.16 < T/L < 0.22 \quad (1),$$

where

T is the length from the diaphragm to the image side surface of the first plano-convex lens as reduced to the length in air; and L is the total length of the objective optical system.

The thickness of the convex lens of the first group is reduced to worsen the processability when the value of T/L falls below the lower limit of the condition formula (1), whereas the aberrations including the curvature of image go beyond a correctable range to degrade the image quality when the value of T/L rises above the upper limit 0.22 of the condition formula (1).

When an objective optical system according to the present invention is provided with a lens support structure, preferably, it satisfies the requirement of condition formula (1') shown below:

$$0.17 < T/L < 0.22 \quad (1'),$$

where

T is the length from the diaphragm to the image side surface of the first plano-convex lens as reduced to the length in air; and L is the total length of the objective optical system.

When an objective optical system according to the present invention is provided with a lens support structure, the processability requirement becomes more rigorous because the outer diameter of the first group of the objective optical system is increased and a chamfered structure section is formed at the object side surface of the first parallel flat plate. Then, the thickness of the convex lens of the first group is reduced to worsen the processability when the value of T/L falls below the lower limit 0.17 of the condition formula (1'), whereas the aberrations including the curvature of image go beyond a correctable range to degrade the image quality when the value of T/L rises above the upper limit 0.22 of the condition formula (1').

Preferably, an objective optical system according to the present invention satisfies the requirement of condition formula (2) shown below:

$$0.9 < f2/L \quad (2),$$

where f2 is the focal length of the second group; and

L is the total length of the objective optical system.

The focus adjustment stroke is extended to make it difficult to downsize the optical system when the value of f2 falls below the lower limit 0.9 of the condition formula (2), whereas the view angle can vary too much to satisfy the requirements of specification of the optical system when the value of f2 rises above the upper limit of the condition formula (2).

In another aspect of the present invention, there is provided an endoscope including: a first group having positive refractive power; a second group having positive refractive power; the first group having: a first parallel flat plate; a diaphragm; a second parallel flat plate; and a first plano-convex lens with its convex surface facing the image side; in the above mentioned order as viewed from the object side; the first parallel flat plate, the second flat parallel plate and the first plano-convex lens forming a cemented lens; the second parallel flat plate being formed by an infrared absorption filter; the second group having: a second plano-convex lens with its convex surface facing the object side; and a treatment device insertion hole for receiving a laser probe to be inserted therein.

With the above-described arrangement, it is possible to provide an endoscope that can reduce the halation produced by guiding light of a laser probe.

Thus, according to the present invention, there are provided a compact objective optical system and a compact endoscope that show excellent color reproducibility and can reduce the halation produced by guiding light of a laser probe.

Still other objects and advantages of the invention will in part be obvious and will in part be apparent from the specification.

The invention accordingly includes the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is aberration graphs of the objective optical system of Example 1;

FIG. 8 is aberration graphs of the objective optical system of Example 2;

DESCRIPTION OF EXEMPLARY EMBODIMENTS

Figure 1:
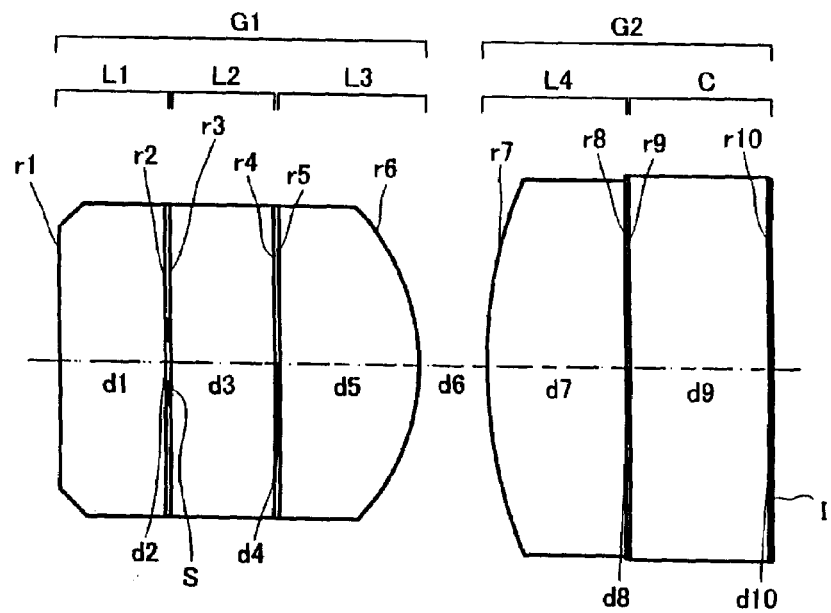
FIG. 1 is a schematic cross-sectional view of the objective optical system of Example 1.

Now, the present invention will be described in greater detail by referring to the accompanying drawings that illustrate the imaging optical systems of Examples 1 through 6. In the drawings, G1 and G2 respectively denote the first lens group and the second lens group and L1 and L2 respectively denote the first parallel flat plate and the second parallel flat plate, whereas L3 and L4 respectively denote the first plano-convex lens and the fourth lens and S, C and I respectively denote the diaphragm, the cover glass and the image plane.

FIG. 1 is a schematic cross-sectional view of the objective optical system of Example 1, showing the lens arrangement thereof.

As seen from FIG. 1, the objective optical system of Example 1 includes a first lens group G1 and a second lens group G2 arranged in the above mentioned order as viewed from the object side.

The first lens group G1 includes a first parallel flat plate L1, a diaphragm, a second parallel flat plate L2 and a first plano-convex lens L3 with its convex surface facing the image side arranged in the above mentioned order as viewed from the object side. A cemented lens is formed by the first parallel flat plate L1, the second parallel flat plate L2 and the first plano-convex lens L3 and the second parallel flat plate L2 is formed by an infrared absorption filter. The object side surface of the first parallel flat plate L1 is chamfered for a lens support structure.

The second lens group G2 includes a second plano-convex lens L4 with its convex surface facing the object side and a cover glass arranged in the above-mentioned order as viewed from the object side. A cemented lens is formed by the second plano-convex lens L4 and the cover glass C.

Numerical value data and the condition formulas of Example 1 will be listed hereinafter.

Figure 2:
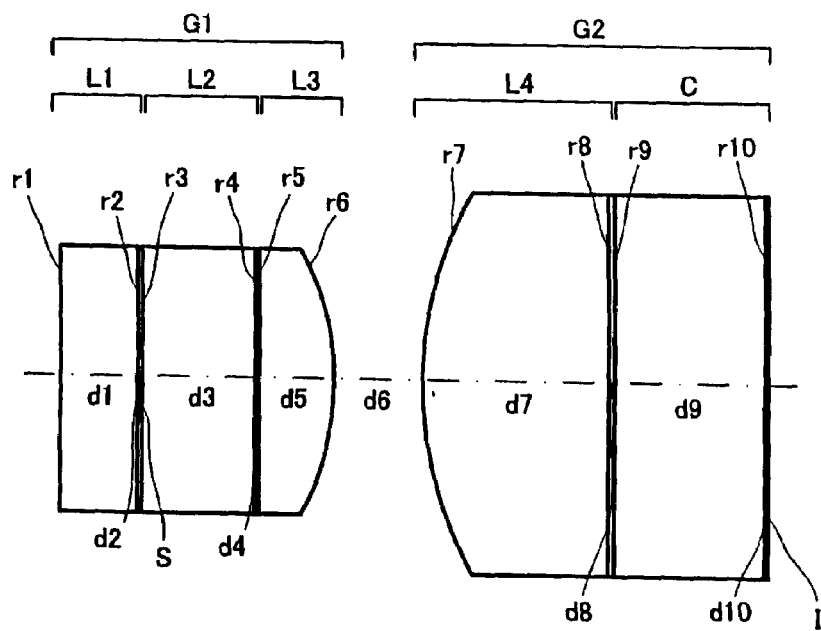
FIG. 2 is a schematic cross-sectional view of the objective optical system of Example 2.

FIG. 2 is a schematic cross-sectional view of the objective optical system of Example 2, showing the lens arrangement thereof.

As seen from FIG. 2, the objective optical system of Example 2 includes a first lens group G1 and a second lens group G2 arranged in the above mentioned order as viewed from the object side.

The first lens group G1 includes a first parallel flat plate L1, a diaphragm, a second parallel flat plate L2 and a first plano-convex lens L3 with its convex surface facing the image side arranged in the above mentioned order as viewed from the object side. A cemented lens is formed by the first parallel flat plate L1, the second parallel flat plate L2 and the first plano-convex lens L3 and the second parallel flat plate L2 is formed by an infrared absorption filter.

The second lens group G2 includes a second plano-convex lens L4 with its convex surface facing the object side and a cover glass C arranged in the above mentioned order as viewed from the object side. A cemented lens is formed by the second plano-convex lens and the cover glass C.

Numerical value data and the condition formulas of Example 2 will be listed hereinafter.

Figure 3:
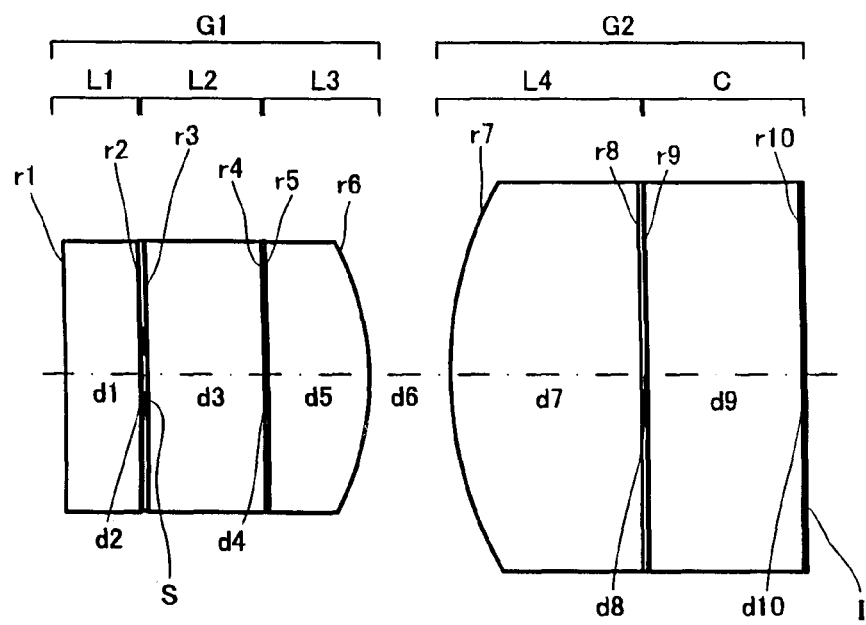
FIG. 3 is a schematic cross-sectional view of the objective optical system of Example 3.

FIG. 3 is a schematic cross-sectional view of the objective optical system of Example 3, showing the lens arrangement thereof.

As seen from FIG. 3, the objective optical system of Example 3 includes a first lens group G1 and a second lens group G2 arranged in the above mentioned order as viewed from the object side.

The first lens group G1 includes a first parallel flat plate L1, a diaphragm, a second parallel flat plate L2 and a first plano-convex lens L3 with its convex surface facing the image side arranged in the above mentioned order as viewed from the object side. A cemented lens is formed by the first parallel flat plate L1, the second parallel flat plate L2 and the first plano-convex lens L3 and the second parallel flat plate L2 is formed by an infrared absorption filter.

The second lens group G2 includes a second plano-convex lens L4 with its convex surface facing the object side and a cover glass C arranged in the above mentioned order as viewed from the object side. A cemented lens is formed by the second plano-convex lens L4 and the cover glass C.

Numerical value data and the condition formulas of Example 3 will be listed hereinafter.

Figure 4:
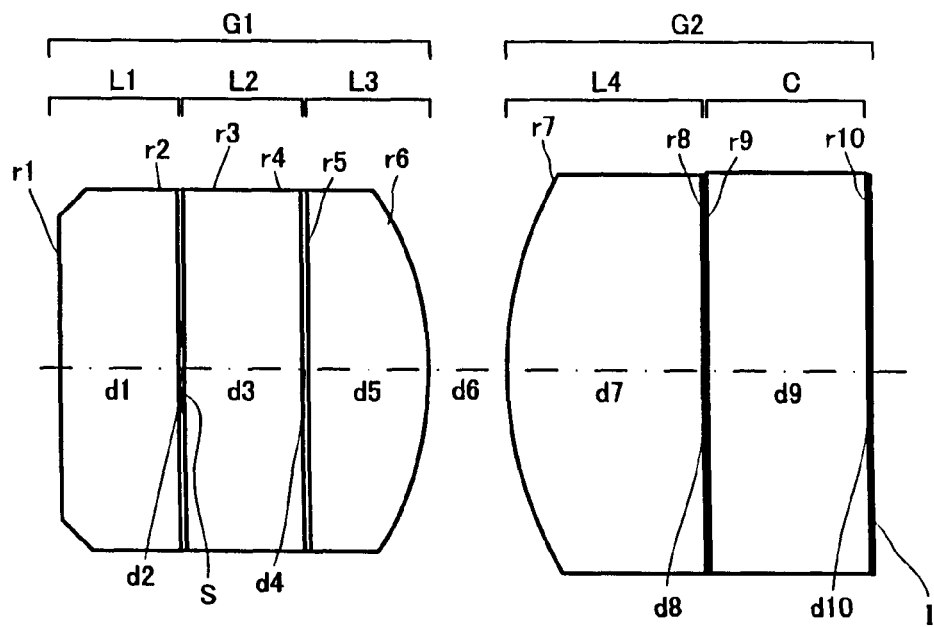
FIG. 4 is a schematic cross-sectional view of the objective optical system of Example 4.

FIG. 4 is a schematic cross-sectional view of the objective optical system of Example 4, showing the lens arrangement thereof.

As seen from FIG. 4, the objective optical system of Example 4 includes a first lens group G1 and a second lens group G2 arranged in the above mentioned order as viewed from the object side.

The first lens group G1 includes a first parallel flat plate L1, a diaphragm, a second parallel flat plate L2 and a first plano-convex lens L3 with its convex surface facing the image side arranged in the above mentioned order as viewed from the object side. A cemented lens is formed by the first parallel flat plate L1, the second parallel flat plate L2 and the first plano-convex lens L3 and the second parallel flat plate L2 is formed by an infrared absorption filter. The object side surface of the first parallel flat plate L1 is chamfered for a lens support structure.

The second lens group G2 includes a second plano-convex lens L4 with its convex surface facing the object side and a cover glass C arranged in the above mentioned order as viewed from the object side. A cemented lens is formed by the second plano-convex lens L4 and the cover glass C.

Numerical value data and the condition formulas of Example 4 will be listed hereinafter.

Figure 5:
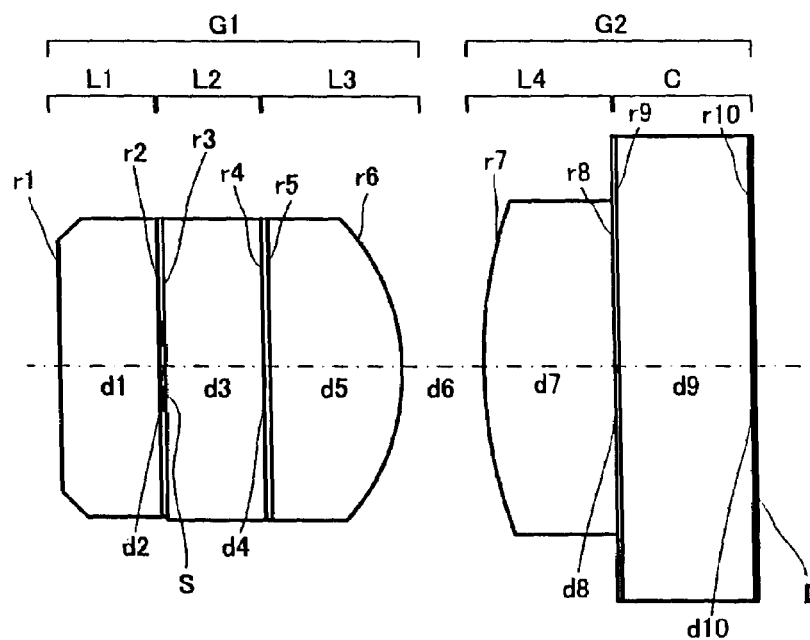
FIG. 5 is a schematic cross-sectional view of the objective optical system of Example 5.

FIG. 5 is a schematic cross-sectional view of the objective optical system of Example 5, showing the lens arrangement thereof.

As seen from FIG. 5, the objective optical system of Example 5 includes a first lens group G1 and a second lens group G2 arranged in the above mentioned order as viewed from the object side.

The first lens group G1 includes a first parallel flat plate L1, a diaphragm, a second parallel flat plate L2 and a first plano-convex lens L3 with its convex surface facing the image side arranged in the above mentioned order as viewed from the object side. A cemented lens is formed by the first parallel flat plate L1, the second parallel flat plate L2 and the first plano-convex lens L3 and the second parallel flat plate L2 is formed by an infrared absorption filter. The object side surface of the first parallel flat plate L1 is chamfered for a lens support structure.

The second lens group G2 includes a second plano-convex lens L4 with its convex surface facing the object side and a cover glass C arranged in the above mentioned order as viewed from the object side. A cemented lens is formed by the second plano-convex lens L4 and the cover glass C.

Numerical value data and the condition formulas of Example 5 will be listed hereinafter.

Figure 6:
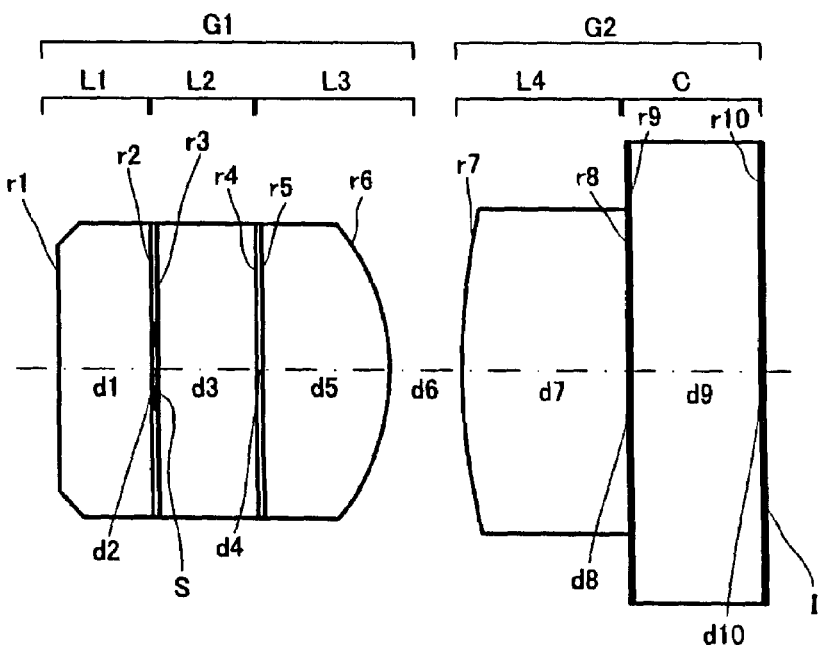
FIG. 6 is a schematic cross-sectional view of the objective optical system of Example 6.
Figure 9:
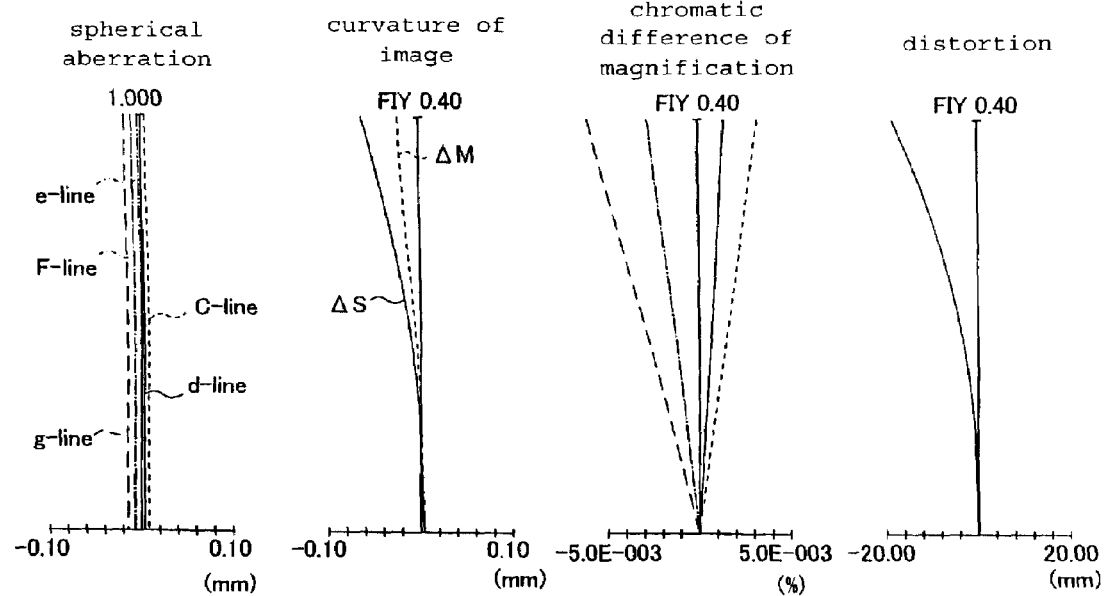
FIG. 9 is aberration graphs of the objective optical system of Example 3.
Figure 10:
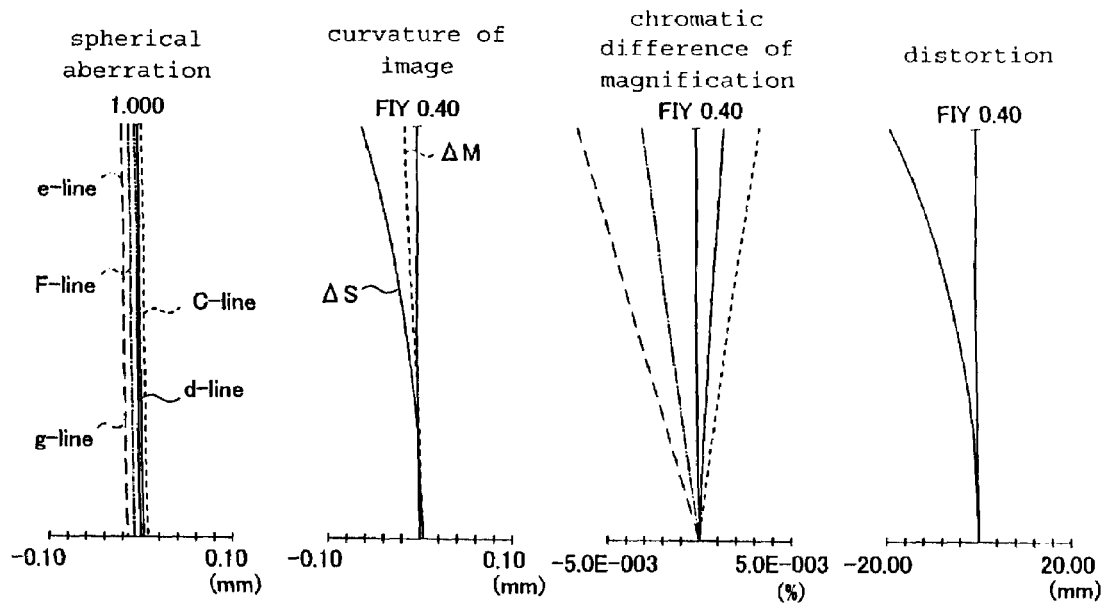
FIG. 10 is aberration graphs of the objective optical system of Example 4.
Figure 11:
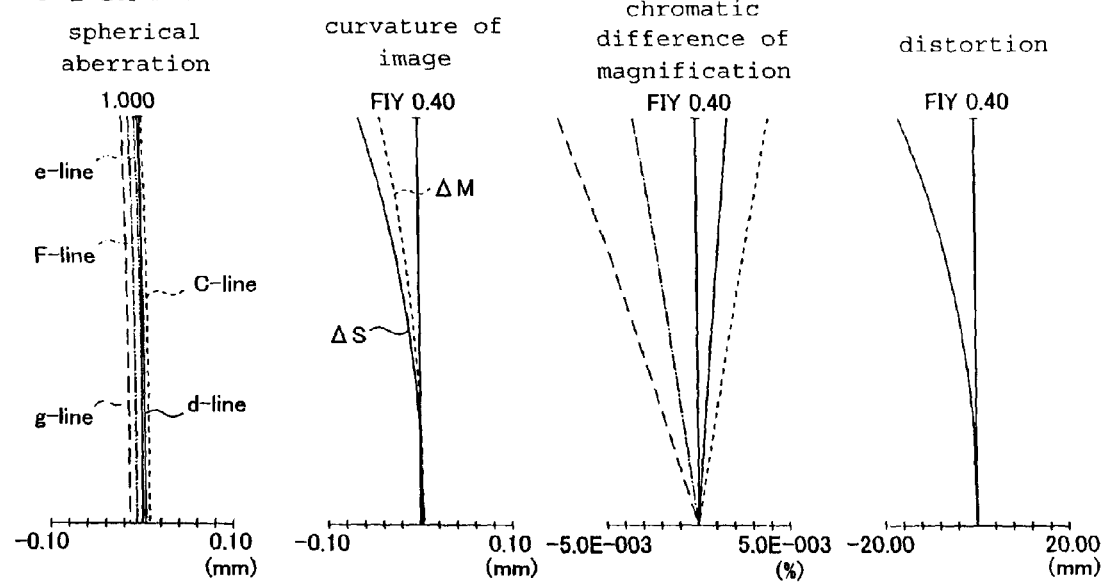
FIG. 11 is aberration graphs of the objective optical system of Example 5.
Figure 12:
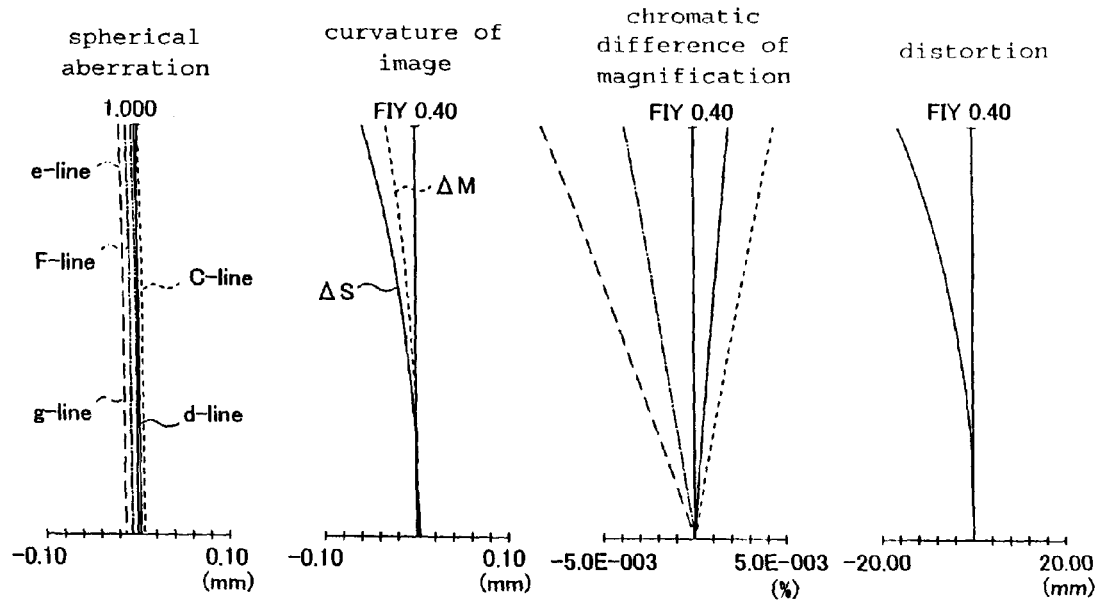
FIG. 12 is aberration graphs of the objective optical system of Example 6.

FIG. 6 is a schematic cross-sectional view of the objective optical system of Example 6, showing the lens arrangement thereof.

As seen from FIG. 6, the objective optical system of Example 6 includes a first lens group G1 and a second lens group G2 arranged in the above mentioned order as viewed from the object side.

The first lens group G1 includes a first parallel flat plate L1, a diaphragm, a second parallel flat plate L2 and a first plano-convex lens L3 with its convex surface facing the image side arranged in the above mentioned order as viewed from the object side. A cemented lens is formed by the first parallel flat plate L1, the second parallel flat plate L2 and the first plano-convex lens L3 and the second parallel flat plate L2 is formed by an infrared absorption filter. The object side surface of the first parallel flat plate L1 is chamfered for a lens support structure.

The second lens group G2 includes a second plano-convex lens L4 with its convex surface facing the object side and a cover glass C arranged in the above mentioned order as viewed from the object side. A cemented lens is formed by the second plano-convex lens L4 and the cover glass C.

Numerical value data and the condition formulas of Example 6 will be listed hereinafter.

Numerical value data of the lenses of the examples are listed below.

In the numerical value data of the lenses of the examples listed below, r denotes the radius of curvature of each lens surface and d denotes the thickness or the intervals of the surfaces of each lens, whereas nd denotes the refractive index along line d of each lens and vd denotes the Abbe number along line d of each lens.

NUMERICAL VALUES OF EXAMPLE 1

| Unit: mm | | | | |
|---|---|---|---|---|
| surface data | | | | |
| surface number | r | d | nd | vd |
| 1 | ∞ | 0.3 | 1.88815 | 40.76 |
| 2 (adhesive · diaphragm) | ∞ | 0.01 | 1.51193 | 63 |
| 3 | ∞ | 0.3 | 1.51965 | 74.7 |
| 4 (adhesive) | ∞ | 0.01 | 1.51193 | 63 |
| 5 | ∞ | 0.4 | 1.88815 | 40.76 |
| 6 | −0.674 | 0.2 | | |
| 7 | 1.444 | 0.4 | 1.51825 | 64.14 |
| 8 (adhesive) | ∞ | 0.01 | 1.51193 | 63 |
| 9 | ∞ | 0.4 | 1.61379 | 50.2 |
| 10 (adhesive) | ∞ | 0.01 | 1.52197 | 63 |
| image surface | ∞ | | | |

| Various data | |
|---|---|
| focal length | 0.6321 |
| power | 1.582 |

NUMERICAL VALUES OF EXAMPLE 2

Unit: mm surface data

| surface number | r | d | nd | νd |
|---|---|---|---|---|
| 1 | ∞ | 0.2 | 1.88815 | 40.76 |
| 2 (adhesive · diaphragm) | ∞ | 0.01 | 1.51193 | 63 |
| 3 | ∞ | 0.3 | 1.51965 | 74.7 |
| 4 (adhesive) | ∞ | 0.01 | 1.51193 | 63 |
| 5 | ∞ | 0.1954 | 1.88815 | 40.76 |
| 6 | −0.7745 | 0.2256 | | |
| 7 | 0.9587 | 0.5 | 1.51825 | 64.14 |
| 8 (adhesive) | ∞ | 0.01 | 1.51193 | 63 |
| 9 | ∞ | 0.4 | 1.61379 | 50.2 |
| 10 (adhesive) | ∞ | 0.01 | 1.52197 | 63 |
| image surface | ∞ | | | |

Various data

| focal length | 0.6462 |
|---|---|
| power | 1.582 |

NUMERICAL VALUES OF EXAMPLE 3

Unit: mm surface data

| surface number | r | d | nd | νd |
|---|---|---|---|---|
| 1 | ∞ | 0.2 | 1.88815 | 40.76 |
| 2 (adhesive · diaphragm) | ∞ | 0.01 | 1.51193 | 63 |
| 3 | ∞ | 0.3 | 1.51965 | 74.7 |
| 4 (adhesive) | ∞ | 0.01 | 1.51193 | 63 |
| 5 | ∞ | 0.25 | 1.88815 | 40.76 |
| 6 | −0.8092 | 0.2052 | | |
| 7 | 0.9265 | 0.5 | 1.51825 | 64.14 |
| 8 (adhesive) | ∞ | 0.01 | 1.51193 | 63 |
| 9 | ∞ | 0.4 | 1.61379 | 50.2 |
| 10 (adhesive) | ∞ | 0.01 | 1.52197 | 63 |
| image surface | ∞ | | | |

Various data

| focal length | 0.6532 |
|---|---|
| power | 1.531 |

NUMERICAL VALUES OF EXAMPLE 4

Unit: mm surface data

| surface number | r | d | nd | νd |
|---|---|---|---|---|
| 1 | ∞ | 0.3 | 1.88815 | 40.76 |
| 2 (adhesive · diaphragm) | ∞ | 0.01 | 1.51193 | 63 |
| 3 | ∞ | 0.3 | 1.51965 | 74.7 |
| 4 (adhesive) | ∞ | 0.01 | 1.51193 | 63 |
| 5 | ∞ | 0.3 | 1.88815 | 40.76 |
| 6 | −0.7701 | 0.2 | | |
| 7 | 0.9633 | 0.5 | 1.51825 | 64.14 |
| 8 (adhesive) | ∞ | 0.01 | 1.51193 | 63 |

-continued

Unit: mm

| 9 | ∞ | 0.4 | 1.61379 | 50.2 |
|---|---|---|---|---|
| 10 (adhesive) | ∞ | 0.01 | 1.52197 | 63 |
| image surface | ∞ | | | |

Various data

| focal length | 0.6381 |
|---|---|
| power | 1.5672 |

NUMERICAL VALUES OF EXAMPLE 5

Unit: mm surface data

| surface number | r | d | nd | νd |
|---|---|---|---|---|
| 1 | ∞ | 0.3 | 1.88815 | 40.76 |
| 2 (adhesive · diaphragm) | ∞ | 0.01 | 1.51193 | 63 |
| 3 | ∞ | 0.3 | 1.51965 | 74.7 |
| 4 (adhesive) | ∞ | 0.01 | 1.51193 | 63 |
| 5 | ∞ | 0.4 | 1.88815 | 40.76 |
| 6 | −0.674 | 0.24 | | |
| 7 | 1.381 | 0.4 | 1.51825 | 64.14 |
| 8 (adhesive) | ∞ | 0.01 | 1.51193 | 63 |
| 9 | ∞ | 0.4 | 1.61379 | 50.2 |
| 10 (adhesive) | ∞ | 0.01 | 1.52197 | 63 |
| image surface | ∞ | | | |

Various data

| focal length | 0.6352 |
|---|---|
| power | 1.5743 |

NUMERICAL VALUES OF EXAMPLE 6

Unit: mm surface data

| surface number | r | d | nd | νd |
|---|---|---|---|---|
| 1 | ∞ | 0.3 | 1.88815 | 40.76 |
| 2 (adhesive · diaphragm) | ∞ | 0.01 | 1.51193 | 63 |
| 3 | ∞ | 0.3 | 1.51965 | 74.7 |
| 4 (adhesive) | ∞ | 0.01 | 1.51193 | 63 |
| 5 | ∞ | 0.4 | 1.88815 | 40.76 |
| 6 | −0.703 | 0.22 | | |
| 7 | 2.132 | 0.5 | 1.88815 | 40.76 |
| 8 (adhesive) | ∞ | 0.01 | 1.51193 | 63 |
| 9 | ∞ | 0.4 | 1.61379 | 50.2 |
| 10 (adhesive) | ∞ | 0.01 | 1.52197 | 63 |
| image surface | ∞ | | | |

Various data

| focal length | 0.6393 |
|---|---|
| power | 1.5642 |

| Condition formula | Example 1 | Example 2 | Example 3 |
|---|---|---|---|
| (1) | 0.205 | 0.165 | 0.178 |
| (2) | 1.39 | 1.02 | 0.96 |
| Condition formula | Example 4 | Example 5 | Example 6 |
| (1) | 0.178 | 0.201 | 0.193 |
| (2) | 0.93 | 1.31 | 1.13 |

FIGS. 7 through 12 show aberration graphs of the above examples. In each of the graphs of spherical aberration and those of chromatic difference of aberration, the solid line indicates the aberration (mm) relative to the d line and the broken line and the dotted line respectively indicate the aberrations (mm) relative to the g line and the C line, whereas the single dotted chain line indicates the aberration relative to the F line and the double dotted chain line indicates the aberration relative to the e line.

In each of the graphs of astigmatism, the solid line ΔS indicates the sagittal image surface and the dotted line ΔM indicates the meridional image surface. In each of the graphs of distortion, the solid line indicates the distortion (%) relative to the d line.

Figure 13:
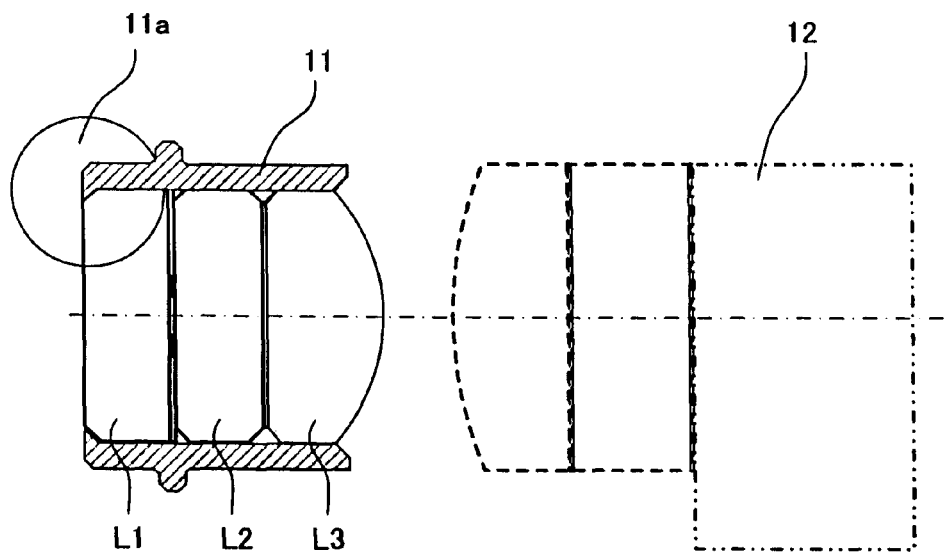
FIG. 13 is a schematic cross-sectional view of the lens support member of an objective optical system according to the present invention.

FIG. 13 is a schematic cross-sectional view of the lens support structure of an objective optical system according to the present invention. Preferably, a chamfered structure part A is formed at the object side surface of the first lens L1 of the objective optical system and the first lens L1 is supported by support section 11a of a lens support member 11 as shown in FIG. 13. Also preferably, a CCD 12 having no electronic shutter is arranged at the image surface I.

Figure 14:
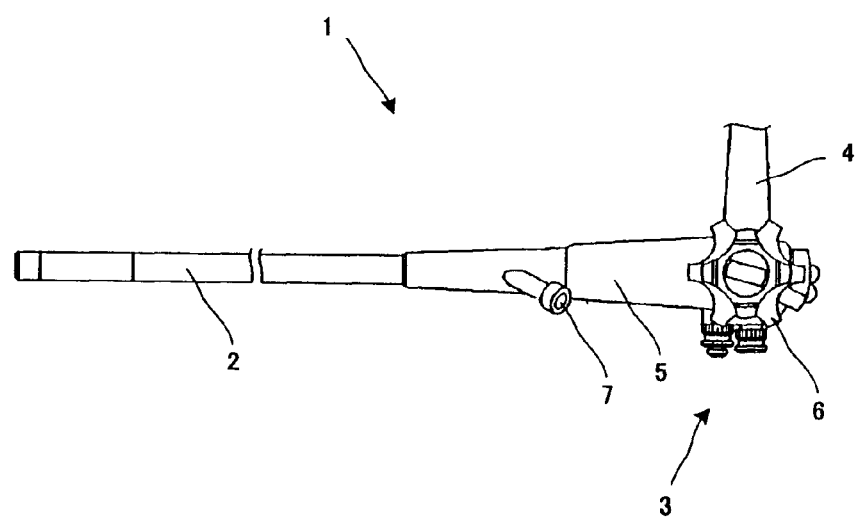
FIG. 14 is a schematic external view of an endoscope according to the present invention.
Figure 15:
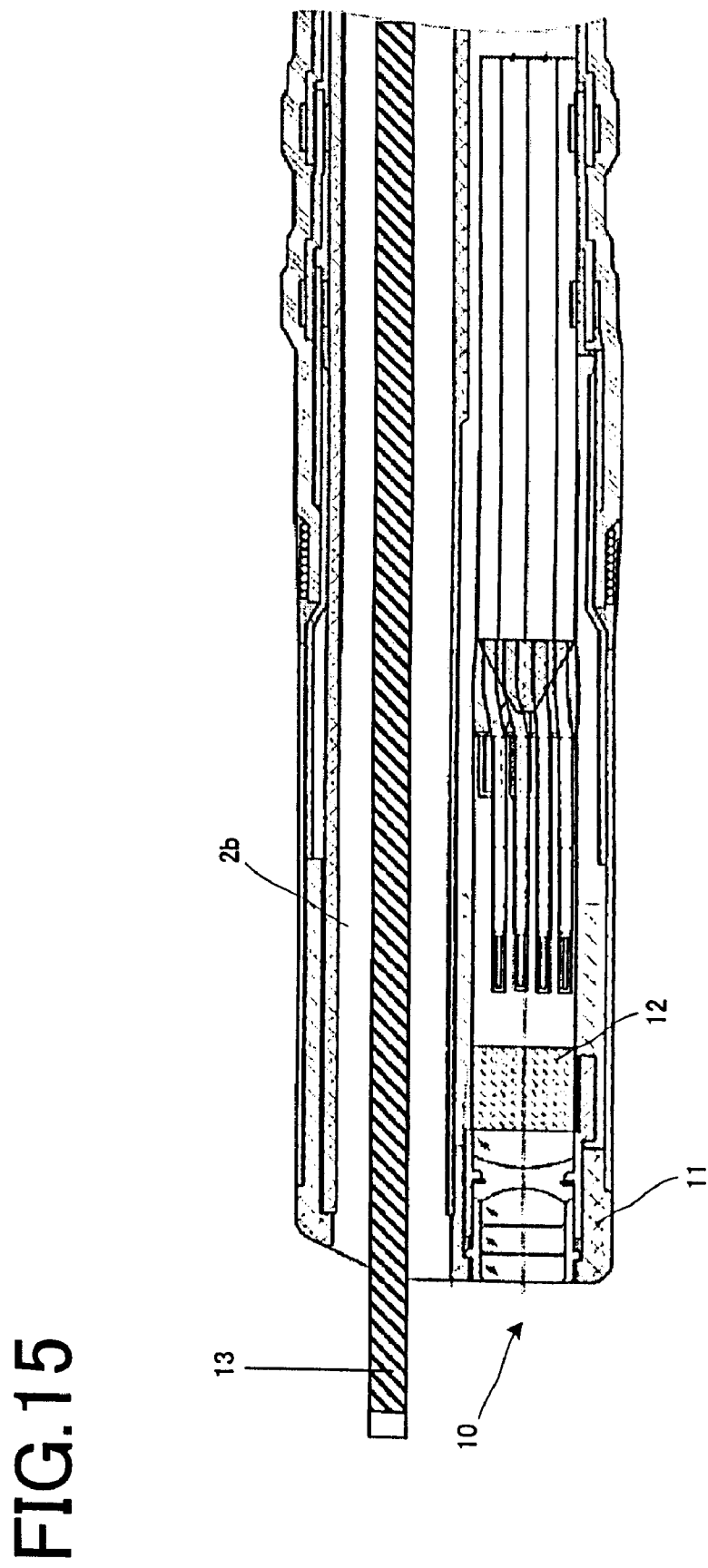
FIG. 15 is a schematic cross-sectional view of a front end part of an endoscope according to the present invention.

FIGS. 14 and 15 schematically illustrate an endoscope system according to the present invention. FIG. 14 is a schematic external view of an endoscope according to the present invention.

The endoscope 1 has an oblong insertion section 2 to be inserted into the ureter of a patient, an operation section 3 which is arranged at the base end of the insertion section 2 so as to be held and operated by an operator and a universal cord 4 extending from the operation section 3.

The operation section 3 includes a holder section 5 which the operator holds and an operation lever 6 is arranged at the base end side of the holder section 5. A treatment device insertion port 7 is arranged at the side of the operation section 3 opposite to the base end thereof. A laser probe 13 is put into the endoscope by way of the treatment device insertion port 7.

FIG. 15 is a schematic cross-sectional view of a front end part of an endoscope according to the present invention.

An objective optical system 10 according to the present invention is arranged at the front end of the insertion section 2 by way of a lens support member 11. A laser probe 13 is put into the treatment device insertion port 2b arranged in parallel at a side of the objective optical system 10.

What is claimed is:

1. An objective optical system comprising:
a first group having positive refractive power; and
a second group having positive refractive power;
the first group having:
a first parallel flat plate;
a diaphragm;
a second parallel flat plate; and
a first plano-convex lens with its convex surface facing the image side; in the above mentioned order as viewed from the object side;
the first parallel flat plate, the second flat parallel plate and the first plano-convex lens forming a cemented lens;
the second parallel flat plate being formed by an infrared absorption filter;
the second group having:
a second plano-convex lens with its convex surface facing the object side.

2. The objective optical system according to claim 1, satisfying the requirement of condition formula (1) shown below:

$$0.16 < T/L < 0.22 \tag{1}$$

where
T is the length from the diaphragm to the image side surface of the first plano-convex lens as reduced to the length in air; and
L is the total length of the objective optical system.

3. The objective optical system according to claim 1, satisfying the requirement of condition formula (1') shown below:

$$0.17 < T/L < 0.22 \tag{1'}$$

where
T is the length from the diaphragm to the image side surface of the first plano-convex lens as reduced to the length in air; and
L is the total length of the objective optical system.

4. The objective optical system according to claim 1, satisfying the requirement of condition formula (2) shown below:

$$0.9 < f2/L \tag{2}$$

where
f2 is the focal length of the second group; and
L is the total length of the objective optical system.

5. An endoscope comprising:
a first group having positive refractive power;
a second group having positive refractive power;
the first group having:
a first parallel flat plate;
a diaphragm;
a second parallel flat plate; and
a first plano-convex lens with its convex surface facing the image side; in the above mentioned order as viewed from the object side;
the first parallel flat plate, the second flat parallel plate and the first plano-convex lens forming a cemented lens;
the second parallel flat plate being formed by an infrared absorption filter;
the second group having:
an objective optical system having a second plano-convex lens with its convex surface facing the object side; and
a treatment device insertion hole for receiving a laser probe to be inserted therein.

* * * * *